(12) United States Patent
Shen et al.

(10) Patent No.: US 7,577,750 B2
(45) Date of Patent: Aug. 18, 2009

(54) SYSTEMS AND METHODS FOR PEER-TO-PEER COLLABORATION TO ENHANCE MULTIMEDIA STREAMING

(75) Inventors: Guobin Shen, Beijing (CN); Hao Wang, Beijing (CN); Shipeng Li, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 10/444,475

(22) Filed: May 23, 2003

(65) Prior Publication Data
US 2004/0236863 A1    Nov. 25, 2004

(51) Int. Cl.
*G06F 15/16* (2006.01)
(52) U.S. Cl. .................. 709/231; 709/203; 709/204; 709/205; 709/246
(58) Field of Classification Search ......... 709/203–205, 709/231, 246
See application file for complete search history.

(56) References Cited

U.S. PATENT DOCUMENTS

| | | | |
|---|---|---|---|
| 5,878,040 A * | 3/1999 | Peirce et al. ............... 370/389 |
| 6,735,633 B1 * | 5/2004 | Welch et al. ............... 709/233 |
| 6,975,613 B1 * | 12/2005 | Johansson ................. 370/338 |
| 6,996,064 B2 * | 2/2006 | Klassen et al. ............. 370/238 |
| 7,028,096 B1 * | 4/2006 | Lee ........................... 709/231 |
| 7,058,014 B2 * | 6/2006 | Sim ........................... 370/230 |
| 7,143,433 B1 * | 11/2006 | Duan et al. ................. 725/115 |
| 7,272,658 B1 * | 9/2007 | Edelman et al. ............ 709/231 |
| 2002/0161898 A1 * | 10/2002 | Hartop et al. .............. 709/227 |
| 2003/0050834 A1 * | 3/2003 | Caplan ........................ 705/14 |
| 2004/0143672 A1 * | 7/2004 | Padmanabham et al. .... 709/231 |

* cited by examiner

*Primary Examiner*—William C Vaughn, Jr.
*Assistant Examiner*—Mohamed Ibrahim
(74) *Attorney, Agent, or Firm*—Lee & Hayes, PLLC

(57) ABSTRACT

Systems and methods are described for using peer-to-peer collaboration to enhance streaming of multimedia content. A peer-paired pyramid streaming ($P^3S$) architecture is introduced that is a hybrid of a client/server structure and a peer-to-peer structure. Clients are hierarchically organized and those that are in the same level are coupled to form peer-pairs. The peers in a peer-pair cooperate by utilizing a connection between them. Streaming is enhanced by allowing each peer to download different portions of a stream and sharing portions not in possession of the other. Error recovery is enhanced by allowing a peer to retrieve a dropped packet from its corresponding peer. A colored overlay is used with a $P^3S$ structure to improve streaming throughput.

14 Claims, 11 Drawing Sheets

Fig. 1 - Prior Art

NETWORK TOPOLOGY
300

ALM STRUCTURE
310

PERFORMANCE OF TRADITIONAL
APPROACH AND BITSTREAM
CUTTING METHOD
320

PEER-PAIRED PYRAMID
STRUCTURE
330

PERFORMANCE OF PEER-PAIR
PYRAMID STREAMING APPROACH

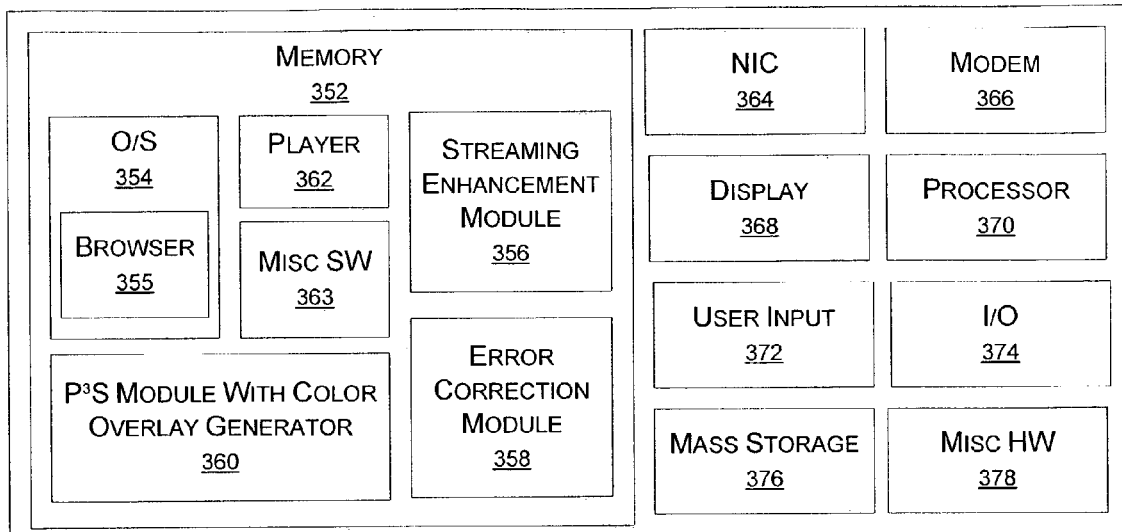
Fig. 3f
CLIENT COMPUTER
350
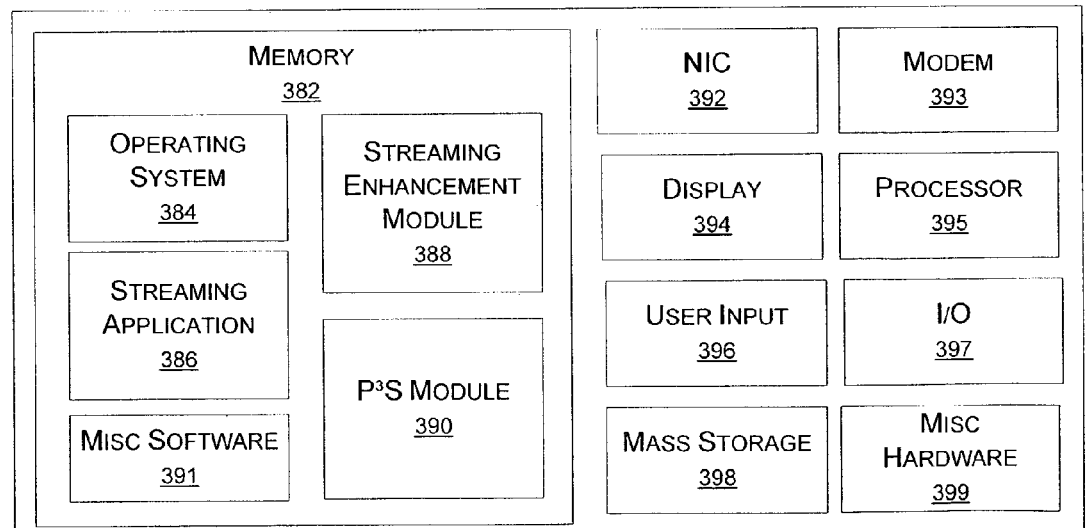
Fig. 3g
SERVER COMPUTER
380

DATA ALLOCATION FOR P³S
STRUCTURE
(L=3, N=14)
400

BURST LOSSES ON SHARED LINK
LEAD TO SHARED PACKET LOSS
500

PACKETS WITH SHARED CONTENT
PASSING A LINK WITH DELAY IN
BETWEEN
600

BURST LOSSES ON SHARED LINK
WITH DELAY
700

SERVER METHOD
800

CLIENT METHOD
900

COLORED OVERLAY
701

OVERLAY STRUCTURE
1000

SYSTEMS AND METHODS FOR PEER-TO-PEER COLLABORATION TO ENHANCE MULTIMEDIA STREAMING

TECHNICAL FIELD

The systems and methods described herein relate to multimedia streaming. More particularly, the systems and methods described herein relate to using peer-to-peer collaboration to enhance streaming of multimedia content.

BACKGROUND

Most applications found on the Internet today are designed based on the simple and straightforward client-server (C-S) model. The C-S model requires a powerful server and brings severe congestion now and then due to its centralized characteristics.

To avoid the drawbacks of the C-S model, some are turning to peer-to-peer technology, which is more robust and may be more efficient, than the pure C-S model. With peer-to-peer streaming, multiple users participating in a video streaming session are organized into an application-level multicast tree structure. All users except the root (i.e. the server) and the leaves (i.e. users that have no egressive links to other users) not only receive data but also relay the data to downstream users.

A diagram of an application-level multicast tree structure 100 is shown in FIG. 1. The application-level multicast tree structure 100 includes a server 102 that serves as the root of the structure. The server 102 communicates with multiple first-tier clients 104, 106, which in turn communicate with multiple second-tier clients 108, 110, 112, 114 (i.e. "leaves"). The server 102 communicates with the first-tier clients 104, 106 which, in turn, communicate with the second-tier clients 108-114 via vertical communication channels 120.

The application-level multicast tree structure 100 is a limited depiction and, in practice, can have many more than three tiers and/or more or less clients located on each tier.

The application-level multicast mimics behavior of an Internet Protocol (IP) multicast in bandwidth efficiency, i.e. there is only one copy of data transmitted over any shared link. However, that copy of data is conveyed via unicast. In other words, the application-level multicast tree is built out of a set of unicast sessions.

Application-level multicast gives rise to several problems—such as network congestion, bandwidth inefficiency, high server load, etc.—that can easily denigrate the end user streaming experience.

SUMMARY

Systems and methods are described for peer-paired pyramid streaming. A peer-paired pyramid streaming ($P^3S$) architecture is provided to take advantage of additional bandwidth that is available between connected clients (i.e. a tier in a multicast tree concept) but not utilized in an application-level multicast.

The $P^3S$ architecture is basically a hybrid client-server and peer-to-peer structure. It not only enables functionalities that are very close to existing application-level multicast frameworks in terms of bandwidth efficiency and server load, but also can help much on mutual quality enhancement. In the $P^3S$ structure, clients at the same level are coupled and peer-pairs are formed. Through the mutual help from the peer receivers, i.e. the two peers in a peer-pair, certain advantages are realized.

In at least one implementation, each client receives a different part of a multimedia content stream. The different parts are then shared between connected clients to take advantage of the additional bandwidth referenced above. When an outgoing link is not large enough to convey the available content, a parent can transmit different portions of the content to each child and let them complement each other to achieve higher quality.

In a $P^3S$ structure, a topmost node (in a diagram) is a media server that originates the streaming process. It sends multimedia data packets to its two children, which will then relay the received packets to their children, and so forth, until a last tier of children is reached. Before relaying packets, each child will perform necessary error recovery, data reassembly, and probably, some data allocation and pruning (rate shaping) it if receives more data than its outgoing links, i.e., the available bandwidth to its children.

In at least one implementation, when a packet loss occurs at one client, the client can attempt to recover the lost packet(s) from a peer instead of requesting the server to resend the packet(s) or dropping the packet(s).

A directory server may also be employed in a $P^3S$ architecture to enhance multimedia content sharing between connected clients, or peers.

Enhanced streaming quality, streaming error recovery and downloading/streaming speed is realized by taking advantage of the additional bandwidth that is available between peers.

BRIEF DESCRIPTION OF THE DRAWINGS

A more complete understanding of exemplary methods and arrangements of the present invention may be had by reference to the following detailed description when taken in conjunction with the accompanying drawings wherein:

FIG. 3f is a block diagram of a client computer.

FIG. 3g is a block diagram of a server computer.

DETAILED DESCRIPTION

The following describes systems and methods for using peer-to-peer collaboration to enhance streaming of multimedia content. A peer-paired pyramid streaming ($P^3S$) architecture is introduced in the systems and methods described herein. Also, techniques utilized in a peer-paired pyramid streaming architecture are described to exemplify how bandwidth available between peers in such an architecture may be exploited to enhance streaming quality, streaming error recovery and streaming speed.

Peer-Paired Pyramid Streaming Architecture

Figure 1:
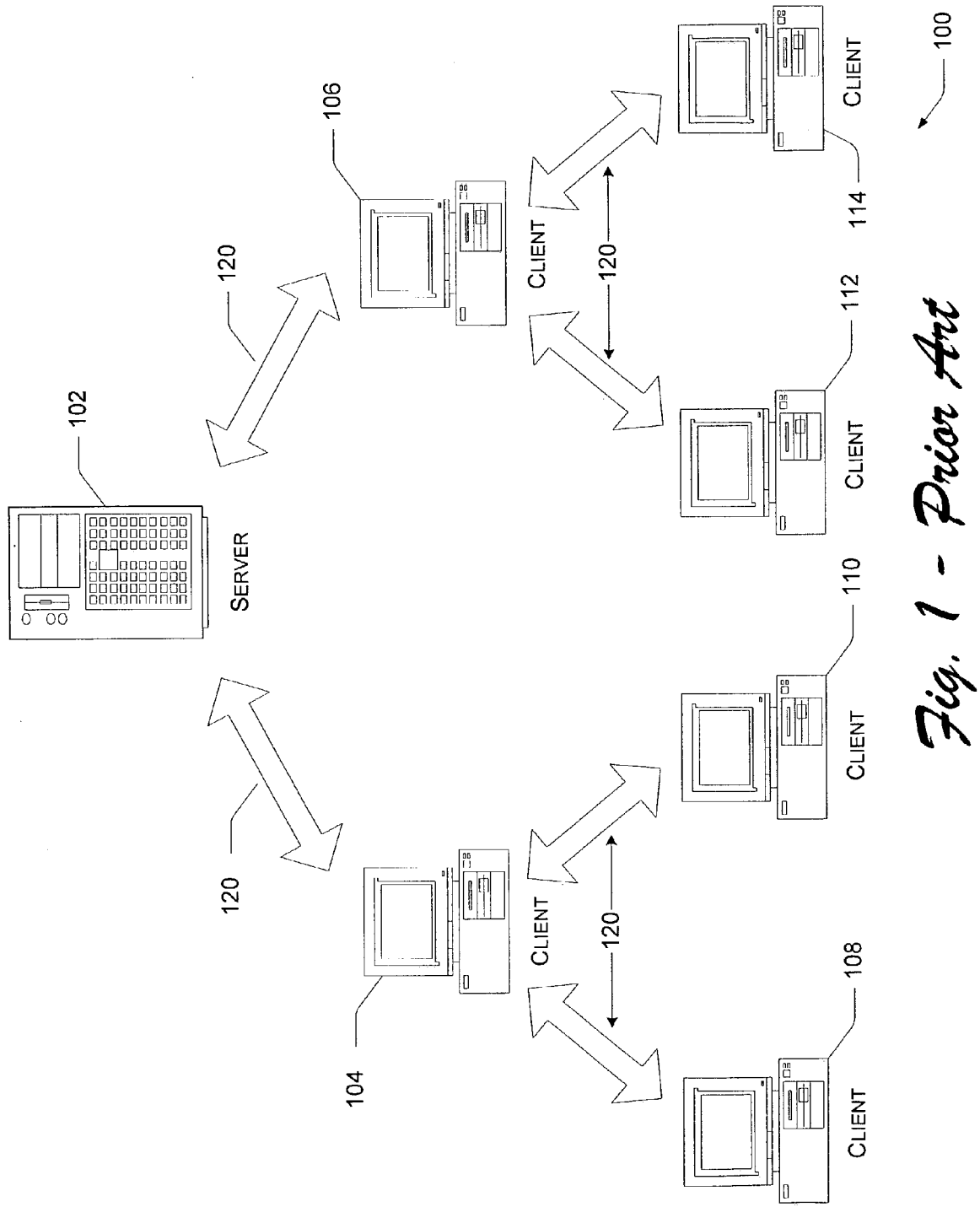
FIG. 1 is a simplified diagram of a prior art application-level multicast tree structure.
Figure 2:
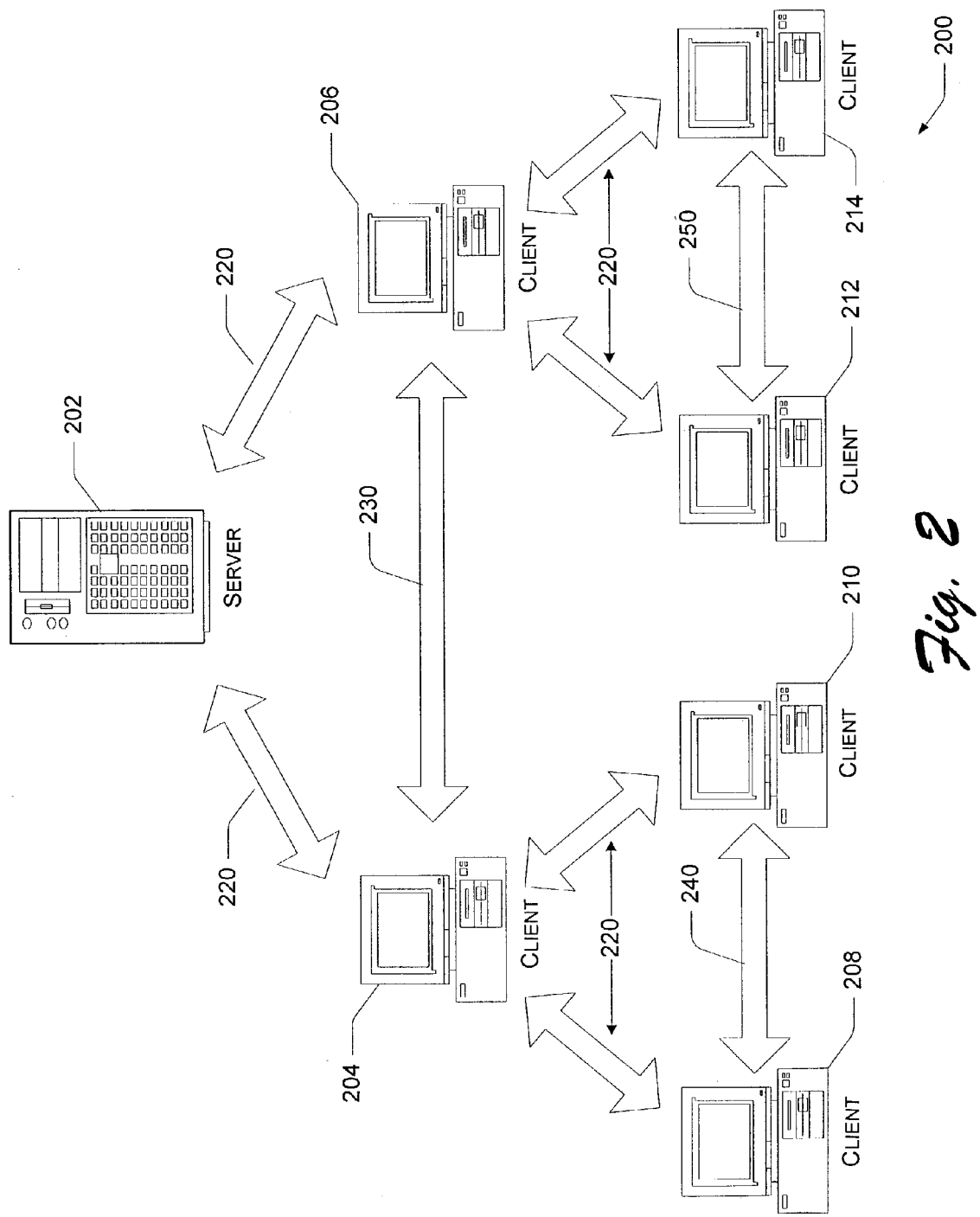
FIG. 2 is a simplified diagram of a peer-paired pyramid streaming architecture.

FIG. 2 is a simplified diagram of a peer-paired pyramid streaming ($P^3S$) architecture 200. The $P^3S$ architecture 200 includes a server 202, first-tier client computer 204 and first-tier client computer 206 that communicate with the server 202. The $P^3S$ architecture 200 also includes multiple second-tier client computers 208, 210, 212, 214 below the first-tier client computers 204, 206. It is noted that the $P^3S$ architecture 200 is a limited depiction and may include more than a root and two tiers and/or more or less clients located on each tier.

The server 202 communicates with the first-tier clients 204, 206 which, in turn, communicate with the second-tier clients 208-214 via vertical communication channels 220. In addition, the first-tier clients 204, 206 communicate with each other via lateral communication channel 230. In this depiction, the first-tier client 204, 206 are peers and more particularly, a peer-pair.

Second-tier clients 208, 210 associated with first-tier client 204 comprise a peer-pair and communicate via lateral communication channel 240. Similarly, second-tier clients 212, 214 associated with first-tier client 206 comprise a peer-pair and communicate via lateral communication channel 250. The lateral communication channels 230, 240, 250 may be implemented as a network, such as a local area network (LAN), a wide access network (WAN), or some other type of network or connection.

Techniques that exploit bandwidth that is available in the lateral connection channels in addition to bandwidth that is available in the vertical communication channels will be discussed in greater detail, below.

As previously discussed, the main idea of application-level multicast streaming is to construct a tree structure out of a set of unicast paths between session participants. It is bandwidth efficient, since only one copy of data is transmitted over any shared unicast path. However, after the application-level multicast tree is built up, there is still some extra bandwidth available between those conceptually unconnected nodes.

Performance Enhancement with $P^3S$

FIGS. 3a-3e illustrate how performance may be improved in a $P^3S$ structure. $P^3S$ has the advantage of exploiting the bandwidth between peer receivers as compared with application-level multicast schemes. Using this extra bandwidth, a peer receiver has chances to exchange data with the other.

Figure 3A:
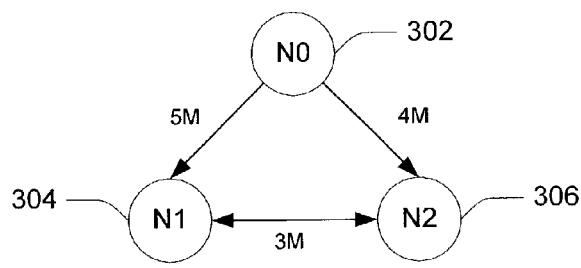
FIG. 3a is a diagram of an exemplary network topology.

FIG. 3a is a diagram of an exemplary network topology 300. The network topology 300 includes three nodes—$N_0$ 302, $N_1$ 304 and $N_2$ 306 that form a triangular cell. $N_0$ 302 is the parent, and $N_1$ 302 and $N_2$ 304 are peer receivers. The available bandwidths among them are, respectively, 5 Mbps, 4 Mbps and 3 Mbps.

Figure 3B:
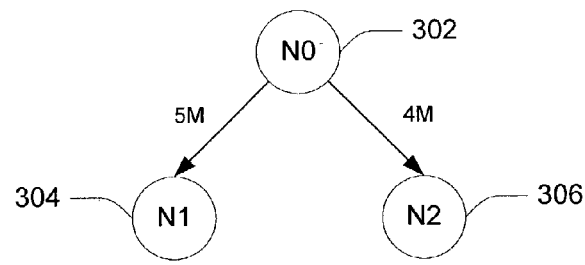
FIG. 3b is a diagram of a prior art application-level multicast streaming scheme.

Assume a scalable coding scheme, such as FGS (Fine Granular Scalable) or PFGS (Progressive Fine Granular Scalable) is used to compress the stream. In such a case, the bit streams can be aggregated to deliver better quality. Assume the source stream (at $N_0$ 302) has a maximum bit rate of 6 Mbps. In existing application-level multicast streaming schemes, a delivery tree may be constructed as shown in FIG. 3b. A unicast session is set up for each receiver. $N_0$ 302 will accommodate $N_1$ 304 and $N_2$ 306 with the maximum content their connections can handle.

Figure 3C:
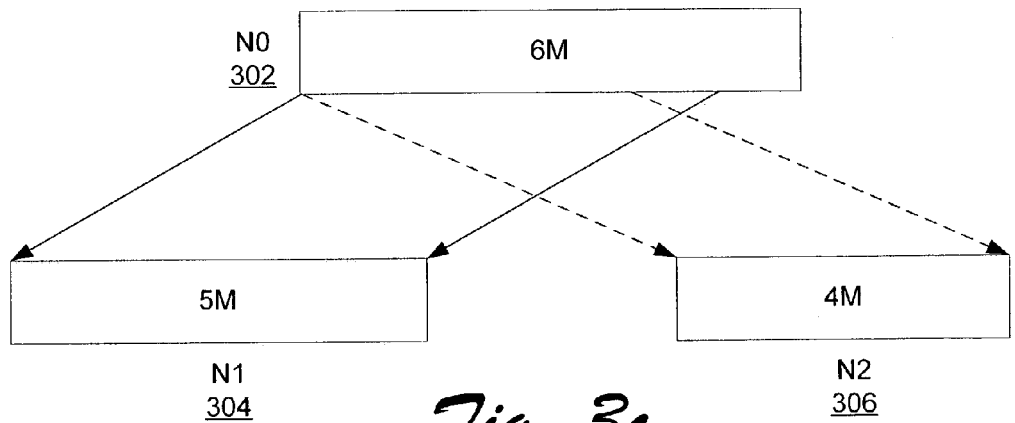
FIG. 3c is a diagram showing performance of a prior art approach to a bitstream cuffing method.

FIG. 3c is a depiction of performance of a prior art approach to a bitstream cutting method used in configurations such as depicted in FIG. 3a and FIG. 3b. $N_0$ 302 is capable of streaming 6 Mbps. $N_1$ 304 can receive 5 Mbps of streaming data taken from $N_0$ 302, and $N_2$ 306 can receive 4 Mbps of streaming data from $N_0$ 301.

Figure 3D:
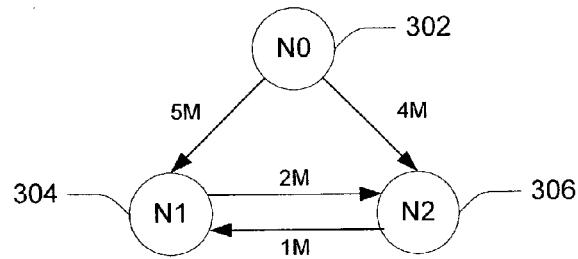
FIG. 3d is a diagram depicting an exemplary peer-paired pyramid structure.

FIG. 3d is a depiction of a peer-paired pyramid structure 330 that is similar to the application-level multicast structure 310 shown in FIG. 3c. The $P^3S$ structure 330 also includes $N_0$ 302, $N_1$ 304 and $N_2$ 306. $N_1$ 304 receives streaming data from $N_0$ at 5 Mbps, and $N_2$ 306 receives streaming data from $N_0$ at 4 Mbps.

However, the $P^3S$ structure 300 also shows that a connection between peer receivers ($N_1$ 304 and $N_2$ 306) is also utilized. In the present example, two additional logically opposite paths are set up. The path from $N_1$ 304 to $N_2$ 306 transmits streaming data at a rate of 2 Mbps. The opposite path from $N_2$ 304 to $N_1$ 304 transmits streaming data at a rate of 1 Mbps.

With such data allocation and the data exchanges between the two peer clients ($N_1$ 304 and $N_2$ 306), the final presentation qualities of both clients can be improved to 6 Mbps.

Figure 3E:
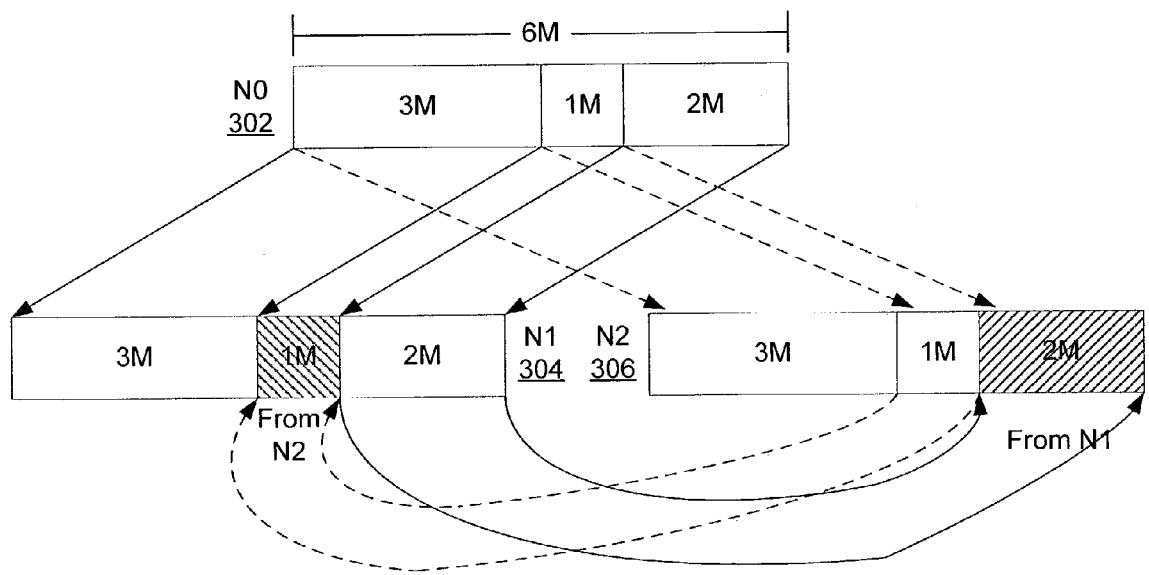
FIG. 3e is a diagram showing performance of an exemplary peer-paired pyramid approach to streaming.

FIG. 3e depicts performance of a peer-paired pyramid approach to streaming. The example shown in FIG. 3e corresponds to the $P^3S$ structure depicted in FIG. 3d.

Again, $N_0$ 302 can stream multimedia data at 6 Mbps. As shown here, the 6 Mbps is divided into three segments of 3 Mbps, 1 Mbps and 2 Mbps. $N_1$ 304 receives data from $N_0$ 302 at 5 Mbps and $N_2$ 306 receives data from $N_0$ 302 at 4 Mbps. To supplement these rates, $N_1$ 304 receives an additional 1 Mbps of streaming data from $N_2$ 306, streaming data that was not transmitted to $N_1$ 304 from $N_0$ 302. Likewise, $N_2$ 306 receives an additional 2 Mbps of streaming data from $N_1$ 304, streaming data that was not transmitted to $N_2$ 306 from $N_0$ 302. As a result, both $N_1$ 304 and $N_2$ 306 increase streaming quality to a maximum 6 Mbps available from $N_0$ 302.

The example described above shows only one element cell of the $P^3S$ structure. But the effect of such mutual help between peers will propagate to lower tiers because it prepares better sources for subsequent tiers. Techniques are described below that show how overall (global) throughput of the entire session can be maximized.

Optimal Data Allocation

Figure 4:
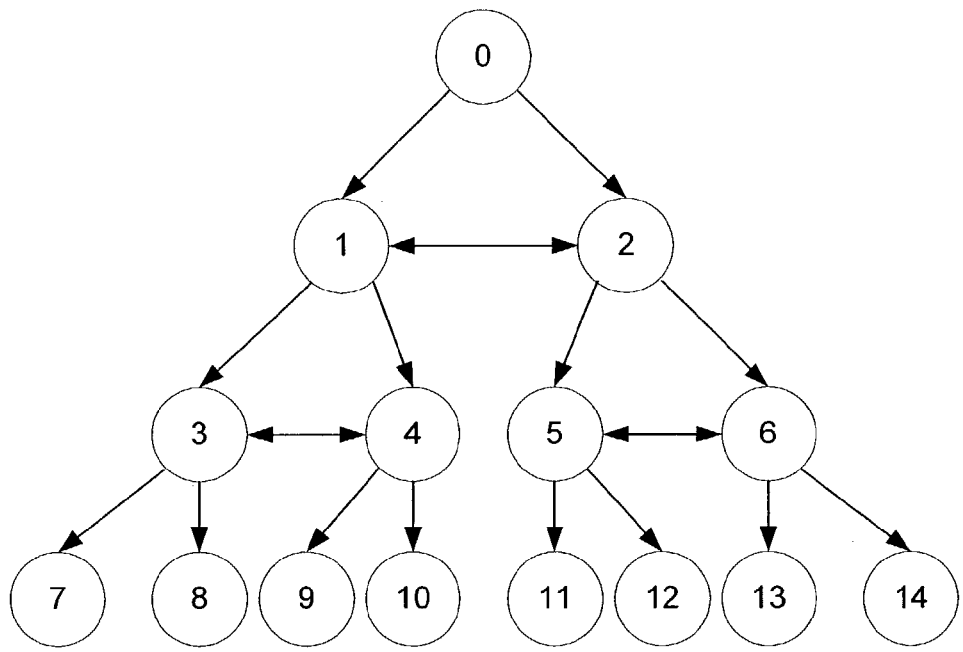
FIG. 4 is an exemplary data allocation for a peer-paired pyramid structure.

Given a complete $P^3S$ structure with L levels, the number of receivers, N, equals $\Sigma_{l=1}^{L} 2^l = 2^{L+1} - 2$. Receivers are labeled in a breadth-first fashion as 1, 2, ..., N, and a server is labeled as 0. FIG. 4 is a diagram depicting an exemplary data allocation for a P3S structure having L=3 and N=14.

For the sake of example, assume $k \in [0, N/2-1]$, $i,j \in \{1,2\}$ and $i \neq j$. The topology meets the following conditions:

There exists a unidirectional pate from node k to node 2K+1, with the available bandwidth of B(k→2K+i); and There exists a bi-directional path between node 2k+i and node 2K+j, with the available bandwidth of B(2k+1 ↔ 2K+2).

The unicast transmissions meet the following conditions:

There exists a transmission session from node k to node 2k+i, denoted as T(k→2k+i), with the data rate of ||T(k→2k+i)||; and There exists a transmission session from node 2k+i to node 2k+j, denoted as T(2k+i→2k+j), with the data rate of ∥T(2k+i→2k+j)∥.

Let $\|T_0(z)\|$ be the aggregated data rate of node z, $z \in [1, N]$. The data rate of the source stream at the server (node 0) is denoted as $\|T_0(0)\|$. The performance metric for data allocation is the sum of aggregated data rate of very node in P³S, which is expressed as:

$$\sum_k \sum_i \|T_o(2k+i)\| \quad (1)$$

The optimal data allocation problem is then formulated as:

$$\max\left(\sum_k \sum_i \|T_o(2k+i)\|\right) \quad (2)$$

and the constraints are:

$$\|T_0(2k+i)\| = \|T(k \to 2k+i)\| + \|T(2k+j \to 2k+i)\| \quad (2\text{-}1)$$

$$\|T(k \to 2k+i)\| \leq B(k \to 2k+i) \quad (2\text{-}2)$$

$$\|T(2k+i \to 2k+j)\| + \|T(2k+j \to 2k+i)\| \leq B(2k+1 \leftrightarrow 2k3+2) \quad (2\text{-}3)$$

$$\|T(k \to 2k+i)\| \leq \|T_0(k)\| \quad (2\text{-}4)$$

$$\|T(2k+i \to 2k+j)\| \leq \|T(k \to 2k+i)\| \quad (2\text{-}5)$$

$$\|T_0(2k+i)\| \leq 0 \quad (2\text{-}6)$$

$$\|T(k \to 2k+i)\| \leq 0 \quad (2\text{-}7)$$

$$\|T(2k+i \to 2k+j)\| \geq 0 \quad (2\text{-}8)$$

Each constraint has a specific physical meaning. Equation (2-1) states that the aggregated data rate of a node comes from two sources. One is its parent and the other is its peer receiver. Equation (2-2) and equation (2-3) state bandwidth constraints. Equation (2-4) and equation (2-5) state the data rate constraints. To elaborate, equation (2-4) says that a node cannot send (to its child) more data than it can obtain (after data aggregation). Equation (2-5) says that a node cannot send (to its peer) more data than the portion of data it obtained directly from the parent. The other constraints are easily understood by those skilled in the art.

With the formulation of the target and all the constraints, the problem turns out to be a linear programming problem. It can be solved with some existing linear programming algorithm, such as the simplex method.

Greedy Data Allocation

Since the optimal data allocation described above may take an undesirable amount of time to collect all the necessary constraints (the complexity is $O(2^n)$), it is desirable to have a simpler method of determining data allocation while allowing a slight tradeoff in performance.

Such a method is described below and is referred to as the greedy data allocation method. The greedy data allocation method is a simplified version of the optimal data allocation method in that it is "one-step" optimal. The greedy data allocation method needs to know only three bandwidths (three edges of a triangular cell) and the complexity is only O(n).

Given the three bandwidths (plus the data rate available at the parent node), there are several methods that can achieve maximum overall throughput of the cell. In at least one implementation, to embody fairness in data allocation, bandwidth is allocated in balance, or as in balance as possible under the prerequisite condition that all of the available bandwidths be maximally utilized.

In other words, the benefit (help obtained from the other peer) and contribution (help offered to the other peer) should match. Only in the case that one peer receiver has achieved best quality available from the parent and there is still bandwidth left, is this remaining bandwidth allocated to the other peer.

In the following example, reference is made to FIG. 3a (network topology 300) in order to more fully explain the greedy data allocation method. Assume that that bandwidth from $N_0$ 302 to $N_1$ 304 is a, and the bandwidth from $N_0$ 302 to $N_2$ 306 is b, where $a \geq b$. Also, assume that the bandwidth between $N_1$ 304 and $N_2$ 306 is c.

Furthermore, the data the data rate available to $N_0$ is D. Let $T_{01}$, $T_{02}$, $T_{12}$ and $T_{21}$ be the data rate from $N_0$ 302 to $N_1$ 304, $N_0$ 302 to $N_2$ 306, $N_1$ 304 to $N_2$ 306, and $N_2$ 306 to $N_1$ 304, respectively. The greedy data allocation method holds to the following:

If $D \leq b \leq a$, the data allocation is trivial.

$$T_{01} = T_{02} = [0, D],$$

$$T_{12} = T_{21} = 0;$$

If $b \leq D \leq a$, $$T_{01} = [0, D]$$

$$T_{02} = [0, b]$$

$$T_{12} = [b, \min(b+c, D))]$$

$$T_{21} = 0;$$

If $b \leq a \leq D$, $$T_{01} = \left[0, \max\left(0, b - \frac{c}{2}, b + a - \frac{c}{2} + \min\left(\frac{c}{2}, b\right) - D\right)\right] \cup \left[b, \min\left(D, a + \min\left(\frac{c}{2}, b\right)\right)\right],$$

$$T_{02} = [0, b],$$

$$T_{12} = \left[b, \min\left(b + a, \max\left(c, b + \frac{c}{2}, b + a + \frac{c}{2} + \min\left(\frac{c}{2}, b\right) - D\right), D\right)\right],$$

$$T_{21} = \left[\max\left(0, b - \frac{c}{2}, b + a - \frac{c}{2} + \min\left(\frac{c}{2}, b\right) - D\right), b\right].$$

In the notation used above, the two numbers in the square brackets are the starting and the ending it rate that the client should get. The data rate is their difference. Thus, the results not only show the allocated data rate, but also instruct how the bit stream should be cut.

Exemplary Client Computer

FIG. 3f is a block diagram of an exemplary client computer 350 in accordance with the systems and methods described herein. The client computer 350 includes memory 352 that stores a client computer operating system 354 that includes a browser 355 that provides the client computer 350 with the ability to access one or more networks, such as the Internet (not shown). A content player 362 stored in the memory 352 is configured to play audio, video or multimedia content in conjunction with other components in the client computer 350.

A streaming enhancement module 356, an error correction module 358 and a P³S module with color overlay generator 360 are also stored in the memory. The streaming enhancement module 356 is configured to carry out P³S functions described herein, such as receiving streaming data from a peer as well as a server, transmitting streaming data to a peer, etc. The error correction module 358 is configured to detect streaming data transmission errors and attempt to correct them as described herein, such as by requesting/receiving redundant data packets from a peer or a server. The P³S module with color overlay generator 360 is configured to properly join and leave a P³S system (i.e. group, network, etc.) by making appropriate join requests, gathering information about system computers, connecting to an appropriate parent computer, selecting an appropriate peer computer, etc. The memory 352 also stores miscellaneous software that may be utilized to carry out operations typically found in a client computer.

The client computer 350 also includes a network interface card (NIC) 364, a modem 366, a display 368 and a processor 370. The NIC 364 and the modem 366 provide a means for, among other things, receiving streaming data from a server or a peer and for transmitting streaming data to a peer.

A user input module 372 is shown incorporated into the client computer 350 and may include a keyboard, mouse, stylus, and/or the like. The client computer 350 also includes an input/output (I/O) module 374 that provides a path for communicating with peripheral devices (not shown) that may be connected to the client computer 350. A mass storage unit 376 and other miscellaneous hardware 378 are also included in the client computer 350.

It is noted that the depiction of the client computer 350 and its elements is exemplary only and that in practice, other elements may be present in the computer or elements shown in FIG. 3f may not be included. As long as the client computer is configured to perform the functionality set forth herein, the client computer is within the scope of the described systems and method.

Exemplary Server Computer

FIG. 3g is a block diagram of an exemplary server computer 380 in accordance with the systems and methods described herein. The server computer 380 includes memory 382 that stores a server computer operating system 384 that controls the operations of the server computer 380. A streaming application 386 is stored in the memory 382 that is configured to stream multimedia content data to one or more client computers (not shown). A streaming enhancement module 388 stored in the memory 382 provides streaming in accordance with the techniques described herein.

The memory 382 also includes a P³S module 390 and other miscellaneous software 391. The P³S module 390 is configured to set up a P³S system with multiple client computers, providing structure to the computers, identifying peer-pairs among the client computers, etc. The miscellaneous software 391 may include other software that is necessary to provide server functionality to the server computer 380.

The server computer 380 also includes a network interface card (NIC) 392, a modem 393, a display 394 and a processor 395. The NIC 392 and the modem 393 provide a means for, among other things, transmitting streaming data from the server computer 380 to client computers.

A user input module 396 is shown incorporated into the server computer 380 and may include a keyboard, mouse, stylus, and/or the like. The server computer 380 also includes an input/output (I/O) module 397 that provides a path for communicating with peripheral devices (not shown) that may be connected to the server computer 380. A mass storage unit 398 and other miscellaneous hardware 399 are also included in the server computer 380.

It is noted that the depiction of the server computer 380 and its elements is exemplary only and that in practice, other elements may be present in the computer or elements shown in FIG. 3g may not be included. As long as the server computer is configured to perform the functionality set forth herein, the server computer is within the scope of the described systems and method.

Enhanced Error Recovery with P³S

Application-level multicast streaming aims at achieving multicast functionality over a set of unicast sessions by utilizing the abundant resources of the client's uplink. Therefore, it achieves the capability of quick bandwidth adaptation like unicast and also the bandwidth efficiency like multicast without the necessity for the routers to support Internet Protocol (IP) multicast. Generally, it is very difficult to perform efficient error recovery in such a framework. Many research efforts are concentrated on local error recovery techniques, however, these techniques fail to work in case of shared losses where none of the clients within the locality receives the packet.

In a P³S architecture, peer-pair data exchange is used to eliminate the inefficiency of the conventional error recovery method (i.e. retransmission) of unicast streaming and to work around the difficulties of error recovery in multicast streaming. When one peer receiver detects a packet loss, it first seeks the lost packet from its partner. If the packet is not recovered after peer-pair data exchange times out, one of the receivers will issue a retransmission request to the parent as a second attempt.

In this manner, if packet losses experienced by the two peer receivers are independent, most of the packets missed at one receiver can be directly recovered from the other. Thus, the retransmission workload and bandwidth consumption of the media server can be greatly reduced.

However, this is not the case for shared (correlated) loss. Even though different paths are set up for different unicast sessions, they may share some links ii since a path usually consists of many hops of links.

Figure 5:
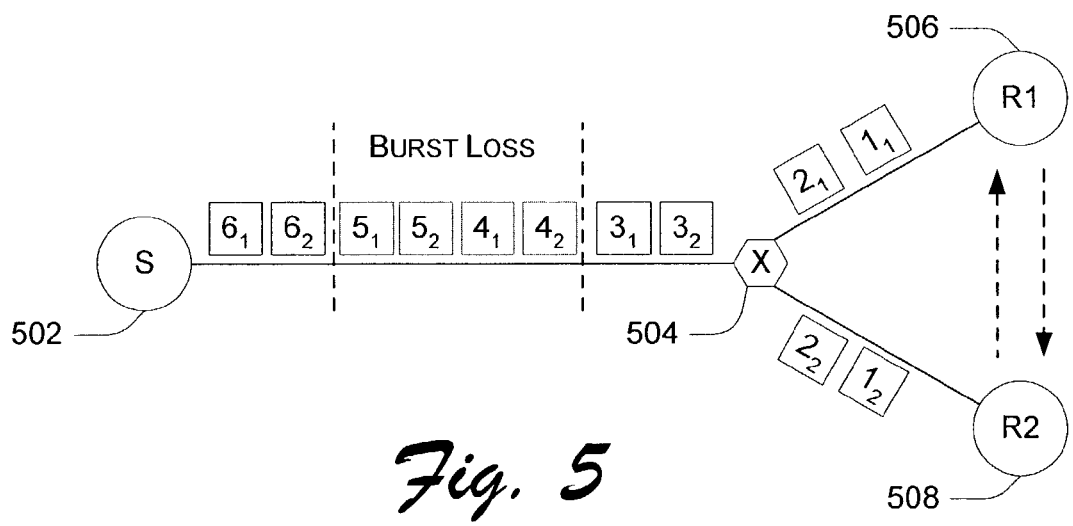
FIG. 5 is a diagram depicting that burst losses on a shared link lead to shared packet loss.

FIG. 5 is a diagram 500 depicting shared packet loss resulting from burst losses on a shared link. The diagram 500 represents a server 502 (S) a router 504 (X), a first receiver 506 (R1) and a second receiver 508 (R2). Each link is represented by an edge in the diagram 500.

The diagram 500 indicates a shared link (server 502→router 504) between the paths to the first receiver 506 (R1) and the second receiver 508 (R2). Data packets are represented by numerals "1", "2", "3", "4", "5" and "6", with data packets destined for the first receiver 506 (R1) designated by a subscript numeral "1" and data packets destined for the second receiver 508 (R2) designated by a subscript numeral "2". Additionally, links between the receivers (R1 506 and R2 508) are represented by edges depicted in broken lines. These links are not conceptually present in application-level multicast streaming, but they are present in peer-paired pyramid streaming.

When the shared link between the server 502 and the router 504 becomes congested, it is likely that the receivers 506, 508 will undergo shared losses. In the example shown, packets labeled "$4_1$", "$4_2$", "$5_1$" and "$5_2$" (destined for both receivers 506, 508) are dropped due to the burst loss occurring on the shared link.

For this case—as far as the application-level multicast streaming goes—the only hope for recovering the lost data packets is retransmission. Other approaches to data packet loss recovery in an ALM streaming structure will not work in this situation.

Figure 6:
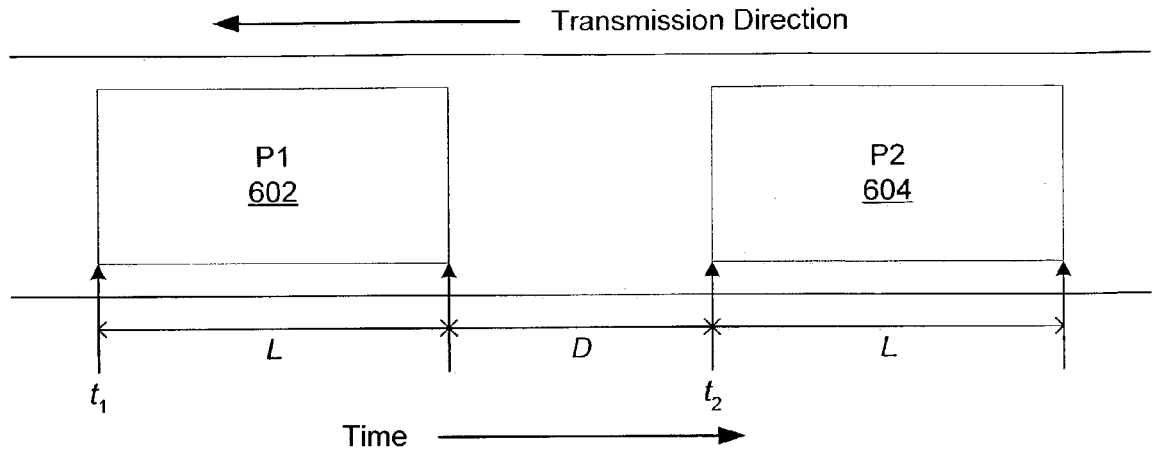
FIG. 6 is a diagram depicting a time delay in between packets with shared content.

To handle such a shared loss of data packets in a P³S environment, a controlled delay may be introduced between the two unicast sessions to the two peer receivers 506, 508. FIG. 6 is a diagram 600 depicting a time delay in between packets with shared content. The diagram 600 shows a first peer packet 602 (P1) and a second peer packet 604 (P2) that contain the same content but are destined for different receivers (not shown). A packet length is identified as L seconds. In the present example, L is shown in units of time. L can be obtained from packet length in bits and transmission bandwidth.

A beginning time for the transmission of the first peer packet 602 (P1) is identified as $t_1$, and a beginning time for the transmission of the second peer packet 604 (P2) is identified as $t_2$. A time interval between the peer packets 602, 604 (i.e. delay) is identified as D seconds. The variables introduced in FIG. 6 will be discussed in greater detail, below, with respect to packet loss probability.

Figure 7:
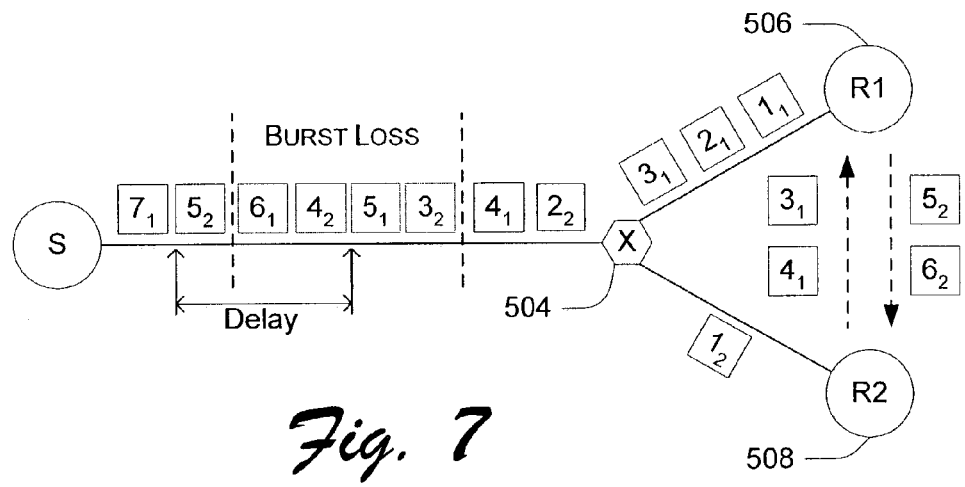
FIG. 7 is a diagram depicting burst losses on a shared link with delay.

FIG. 7 is a diagram 700 similar to the diagram 500 shown in FIG. 5, in that the diagram 700 also represents the server 502 (S), the router 504 (X), the first receiver 506 (R1) and the second receiver 508 (R2). Each link is represented by an edge in the diagram 700.

The diagram 700 illustrates an implementation to introduce some delay between peer packets by carefully scheduling the departure instance of peer packets. The implementation depicted in FIG. 7 simply postpones the packets destined for one of the peer receivers (e.g. R1 506).

In the instanced depicted by the example shown in FIG. 7, the period of burst loss causes peer packets $3_2$, $5_1$, $4_2$ and $6_1$ to be dropped due to the delay of the packet transmission of peer packets destined for R2 508.

When the receivers identify the packets that are missing from their respective transmission, the receivers (R1 506 and R2 508) simply request the missing packets from each other and transfer the same without having to request a retransmission from the server 502.

In one implementation, the Gilbert-Elliot model is used to model the network status. $S_0$ represents the good state and $S_1$ stands for error (congestion) state. A packet can be transmitted correctly only if the system stays in $S_0$ throughout the transmission process of the packet. If the duration of each state follows exponential distribution with expectations $1/\lambda$ and $1/\mu$, respectively, then the probability distribution functions of $S_0$ and $S_1$ are $$p_0(t) = \lambda \cdot e(\exp(-\lambda t)) \text{ and } p_1(t) = \mu \cdot e(\exp(-\mu t))$$

respectively.

A packet loss probability, P(E), can be derived by:

$$P(E) = 1 - P(\overline{E})$$

where $P(\overline{E})$ is the probability that a packet is transmitted successfully.

It is noted that if the network is in a good state at the beginning of a packet, then the packet will be correctly transmitted only if the network stays in good state for at least L seconds. If at any instant during the transmission of the packet the network goes to an error state, then the packet is considered lost. It follows that:

$$P(E) = p_0 \cdot P(T \geq L)$$

$$P(T \geq L) = \int_L^\infty \lambda \cdot e(\exp(\lambda t)) dt$$

where $P(T \geq L)$ is the probability that the network stays in good state for at least L seconds and $p_0$ is the probability that the network is in good state at the beginning of a packet transmission.

If the network is in steady state, then $p_0$ can be calculated as:

$$p_0 = \frac{\mu}{\lambda + \mu}$$

It therefore follows that:

$$P(\overline{E}) = \frac{\mu}{\lambda + \mu} \cdot e(\exp(-\lambda t))$$

and $$P(E) = 1 - \frac{\mu}{\lambda + \mu} \cdot e(\exp(-\lambda t))$$

Packet loss correlation is defined as $P(E_2|E_1)$. That is, given the first peer packet is lost, what is the probability that the second peer packet is also lost. The rationale of this definition lies in the intuition that if the packet loss correlation is high, then the shared loss is very likely to happen. It is noted that the following probability formulas always hold:

$$P(E_2) = P(E_2|E_1) \cdot P(E_1) + P(E_2|\overline{E_1}) \cdot P(\overline{E_1}) \quad [1]$$

and $$P(E_2|\overline{E_1}) = 1 - P(\overline{E_2}|\overline{E_1}) \quad [2]$$

$P(\overline{E_2}|\overline{E_1})$ must be derived so that $P(E_2|E_1)$ can be calculated:

$$P(\overline{E_2}|\overline{E_1}) = P(\overline{E_2}|S_{t2}=S_0) \cdot P(S_{t2}=S_0|\overline{E_1}) + \quad [3]$$
$$P(\overline{E_2}|S_{t2}=S_1) \cdot P(S_{t2}=S_1|\overline{E_1})$$
$$= P(T \geq l) \cdot P(S_{t2}=S_0|S_{tl+1}=S_0)$$

$P_1$ is the probability that the network is in the good state at time $t_0+t$, given that it is in the good state at time $t_0$. Assuming that the interval between the two peer packets (P1 602 and P2 604) is D (i.e. $t_2=t_1+L+D$), then it follows that:

$$P(S_{t2}=S_0|S_{t1+l}=S_0)= \quad [4]$$
$$P_d = \frac{\mu}{\lambda+\mu} + \frac{\lambda}{\lambda+\mu} \cdot e(\exp(-(\lambda+\mu)d))$$

Now, $P(E_2|\overline{E_1})$ may be computed as:

$$1 - P(T \geq l) \cdot P_d = \quad [5]$$
$$1 - e\left(\exp(-\lambda t) \cdot \left(\frac{\mu}{\lambda+\mu} + \frac{\lambda}{\lambda+\mu} \cdot e(\exp(-(\lambda+\mu)d))\right)\right)$$

If the network is in a steady state, then:

$$P(E_2) = P(E_1) = 1 - \frac{\mu}{\lambda + \mu} \cdot e(\exp(-\lambda t)) \quad [6]$$

and $$P(\overline{E_2}) = P(\overline{E_1}) = \frac{\mu}{\lambda + \mu} \cdot e(\exp(-\lambda t)) \quad [7]$$

From Equations [1], [2], [5], [6] and [7], the packet loss correlation is:

$$P(E_2 | E_1) = 1 - \frac{\mu}{\lambda + \mu} \cdot e(\exp(-\lambda l)) + \frac{\frac{\lambda \cdot \mu}{(\lambda + \mu)\exp(2)} \cdot e(\exp(-2\lambda l)) \cdot e(\exp(-(\lambda + \mu)d))}{1 - \frac{\mu}{\lambda + \mu} \cdot e(\exp(-\lambda l))} \quad [8]$$

The conclusion that can be drawn from Equation [8] is that the packet loss correlation drops exponentially with the interval between the peer packets. Having derived that the interval between the peer packets reduces the loss correlation exponentially, it follows that some delay can be introduced (to increase the interval) to combat the shared losses. But there are no feasible techniques to accurately measure the value of $\lambda$ and $\mu$, thus it is hard to get a quantitative value of appropriate delay from the equation. This value should be somehow related to average length of congestion. In at least one implementation, a delay that equals min(1.5 RTT, 0.6 s) is used. However, such a value is empirical.

In another implementation, the delay is adjusted on the fly. The two peer receivers keep on monitoring the shared losses and report to the parent. The parent will extend the delay if the shared loss ratio is large, and it will stop increasing the delay if more delay doesn't significantly reduce the shared loss ratio.

Another implementation alternates packet ordering instead of introducing delays between packets. In the following discussion, an average delay is described as "L" units of packets. A burst loss can be remedied by changing the orderings of the packets to one receiver while leaving the packet ordering to the other receiver (i.e. the peer receiver) intact.

The ordering changes occur periodically with a period of 2L. For example, if L=4, then for every eight (8) packets, the ordering for the first receiver is 1, 2, 3, 4, 5, 6, 7, 8. If the ordering for the second receiver is changed to 5, 6, 7, 8, 1, 2, 3, 4, then no shared losses will occur for any burst loss having a length of four (4) or less. Any packets lost during such a burst loss will be obtainable from the peer receiver.

The relationship between the ordering of the same packet for different receivers can be generalized as: O1=(O2+L)mod (2L). Furthermore, the theoretical performance analysis described above also applies in this case.

An advantage realized by re-ordering packets is that no bandwidth is wasted from introducing a delay between packets. It is noted that a larger L can be introduced to improve performance, but L should be constrained to a size of less than half of a length of a receiver buffer.

Improved Streaming Speed-Colored Overlay with P³S

A novel approach to constructing a colored overlay is described below that, when used in a peer-paired pyramid streaming structure, breaks through bottleneck bandwidth, improves reliability against node failure, and provides greater resiliency to the reality of fluctuation of network metrics. In other words, the colored overlay approach in a P³S structure improves streaming/downloading speed over a network.

The colored overlay described below enables clients to receive data multi-path like, based on FEC (Forward Error Correction) technique. An essential requirement fulfilled by the overlay is to ensure that the aggregated incoming bandwidth of each member in the overlay must exceed the required bit rate.

To that end, the power of multi-path streaming technology is desirable. At the same time, it is desirable to maintain high bandwidth efficiency, as is seen in an application-level multicast structure. Both of these goals are met by applying the colored overlay technique in a P³S structure.

Forward Error Correction (FEC) technique has been overwhelmingly adopted for error protection purposes in data communications as well as in streaming applications. The receiver can still reconstruct the original data when some original packets are missing, provided that there are at least the same number of FEC packets available.

For example, with (N, K) Reed-Solomon codes, as long as K packets out of N packets are received, the K original packets can be restored. The key here is that each receiver needs to receive K distinguishable packets.

Due to the multi-path design, a receiver may receive packets from different senders, which could be other receivers or the server. Therefore, a natural way to most effectively receive K distinguishable packets is to ensure the packets from each sender (with regard to a specific receiver) are mutually parity packets. In the present example, each sender is colored, i.e. packets in different colors are guaranteed to be mutually parity packets.

A simple implementation for such coloring is to use Reed-Solomon codes. If there are K data packets, (M×K) parity packets are generated by using (N,K) R–S code with N=(M+1)*K. Then the (M+1)K packets can be colored with (M+1) colors such as red, green, blue, etc. A sender only sends out packets in its own color, while a receiver may receive packets in any color.

From the foregoing discussion, there are some considerations in building an overlay. First, each node may receive data from one or more upstream nodes. Second, colors should be evenly distributed in the neighborhood of each receiver. Third, the out degree of a node is limited, which represents its limited available uplink bandwidth.

It is noted that a colored overlay process does not strictly conform to the P³S structure because a colored overlay can allow one receiver to get packets from more than one receiver and send packets to more than two receivers. The parents and the children of one receiver can be on different tiers. In other words, the colored overlay can be irregular.

Although the P³S structures depicted herein appear as a regular pyramid structure, it is noted that connections between peers can be zero, which represents there is actually no connection or available bandwidth. The traditional application layer multicast tree can actually represent the most degenerated P³S structure. Use of the colored overlay process described herein provides a more practical approach to improve streaming/downloading speed over a network.

Figure 10A:
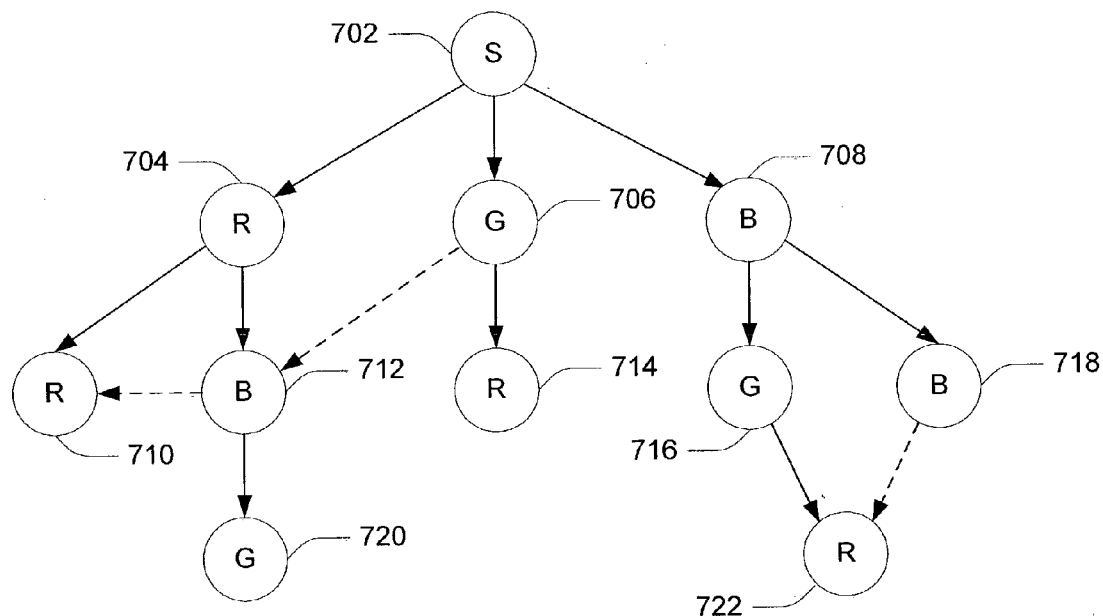
FIG. 10 is a diagram depicting an exemplary colored overlay.

FIG. 10a depicts an example of a colored overlay 701. In the present example, a tree-first method is utilized for its simplicity. When assimilated into the overlay 701, members attempt to find peers with different colors than its parent. This leads to redundant edges added to the overlay (or tree).

The colored overlay 701 includes a server node 702 and three first-tier nodes 704, 706, 708 having the colors red (R), green (G) and blue (B) assigned to them, respectively. The colored overlay 701 also includes five second-tier nodes 710, 712, 714, 716, 718 assigned colors R, B, R, G, B, respectively. The colored overlay 701 also includes two third-tier nodes 720, 722 assigned the colors G and R, respectively.

It is noted that the colored overlay 701 shown in FIG. 10a is exemplary only and can change as nodes are added or removed from the tree. Also, the colored overlay may include any practicable number of tiers, nodes and connection paths as each particular situation dictates.

From the perspective of a node, data may be received through different paths from the source. Each node only needs to maintain local information, including but not limited to, parent, grandparent, children, downstream peers, neighbor list, and its height (i.e. hop count to the source) in the tree. A node that has downstream nodes has to produce parity packets with its own color and send them out. This is a primary cost of this particular approach.

Protocol for Building a Colored Overlay

Bootstrap: Information about the server 702 (or source) may be obtained g from a public site—such as an Internet site identified by a URL (Uniform Resource Locator)—in an out-of-band manner or via a directory server. A new member that wishes to join the multicast group corresponding to the overlay 700 sends a "join" message to the sever 702.

Join Policy: A multicast tree is built incrementally as members join the group. Each node of the tree has its fan-out constraint, which is further decomposed into "child-tokens" and "peer-tokens." Children are distinguished from peers so that members are organized top-down from source to leaf through parent-children relationship, and multi-paths are constructed in a peer-to-peer manner. The distinction between child-token and peer-token will help to achieve a better trade-off between latency and reliability. For efficient transfer and loop avoidance, a client prioritizes an upstream peer with a same height over those with a lower height.

A member establishes and maintains a neighbor list with limited entries during the join process. Each entry of the list contains the information, such as delay, color, height and status (active or inactive), about a specific member to which the current member may connect.

A member need not explicitly measure the bandwidth between itself and its upstream nodes. It may incrementally add peers until the desired bit rate is obtained. The required bit rate can also be achieved by first aggressively connecting to as many different-colored peers as possible and then gradually pruning connections. Rough bandwidth estimation as via monitoring the real receiving data rate may help the pruning process.

Methodological Implementation of Join Policy: Server

Figure 8:
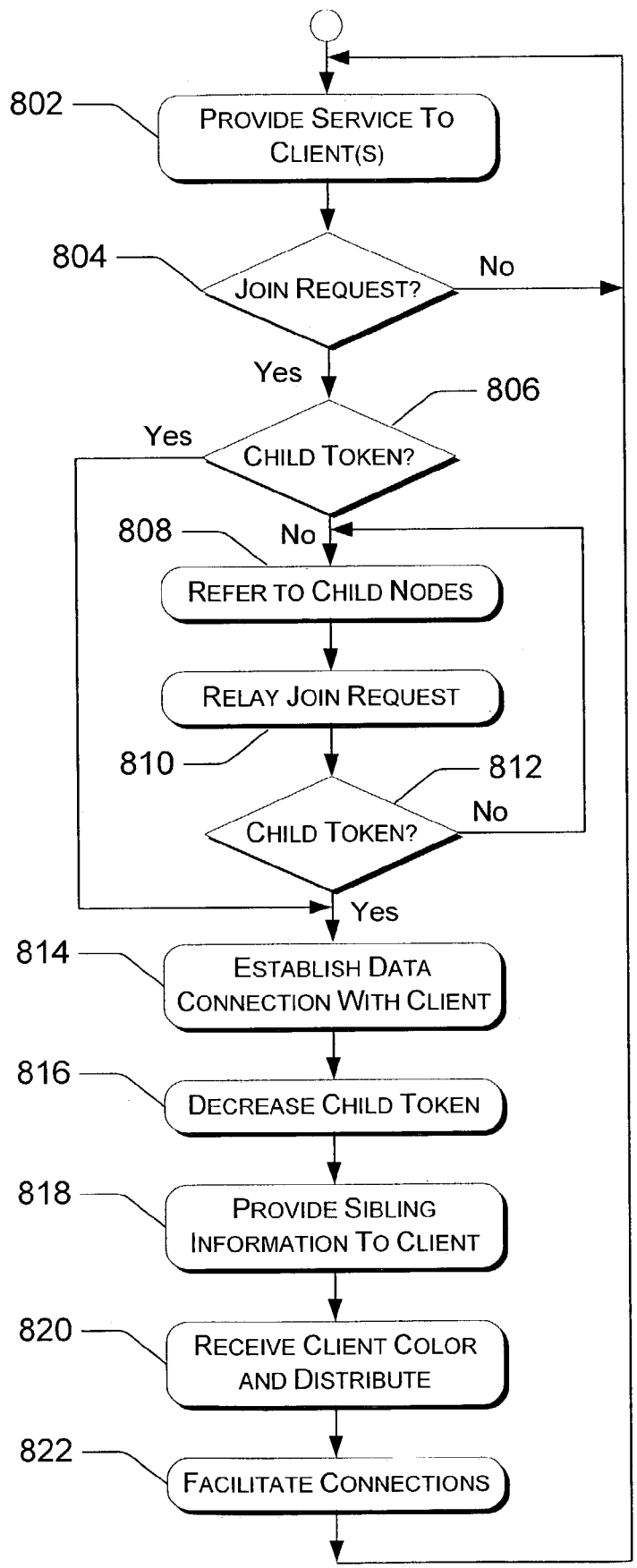
FIG. 8 is a flow diagram depicting a server-side methodological implementation of techniques described herein.

FIG. 8 is a flow diagram 800 that depicts a methodological implementation of a join policy from the point of view of a server. In the following discussion of FIG. 8, reference may be made to elements and reference numerals shown in previous figures.

At block 802, the server 0 (FIG. 4) provides server services, including multimedia streaming, to clients. This service continues as long as the server does not receive a join request from a new client ("No" branch, block 804). When the server 0 receives a join request ("Yes" branch, block 804), then the server determines if the server has any available child-tokens that would allow the new client to connect to the server as a child thereof.

If the server has available child-tokens ("Yes" branch, block 806), then the server 0 establishes a data connection with the client at block 814. If there are no child-tokens available at the server ("No" branch, block 806), then the server redirects the client to a set of its child nodes 1, 2 (FIG. 2) at block 808.

At block 810, the client determines the most appropriate node of the child nodes to which it should connect and relays a new join request to the child node via the server. If that child node has an available child-token ("Yes" branch, block 812), then the server helps to establish a data connection between the child node and the client (block 814). If no child-token is available at the child node ("No" branch, block 812), then the process repeats blocks 808, 810 and 812 until an appropriate node is found to which the client may connect.

The node that has established a connection with the new client decreases a child-token count by one at block 816. The server provides the new client with information about new client siblings at block 818. The client uses this information to determine a color for itself, the selection of which is then transmitted to the server at block 820 and distributed to other nodes (at least neighboring nodes).

At block 822, the server facilitates data connections between the new client and one or more peers of the new client.

Methodological Implementation of Join Policy: Client

Figure 9:
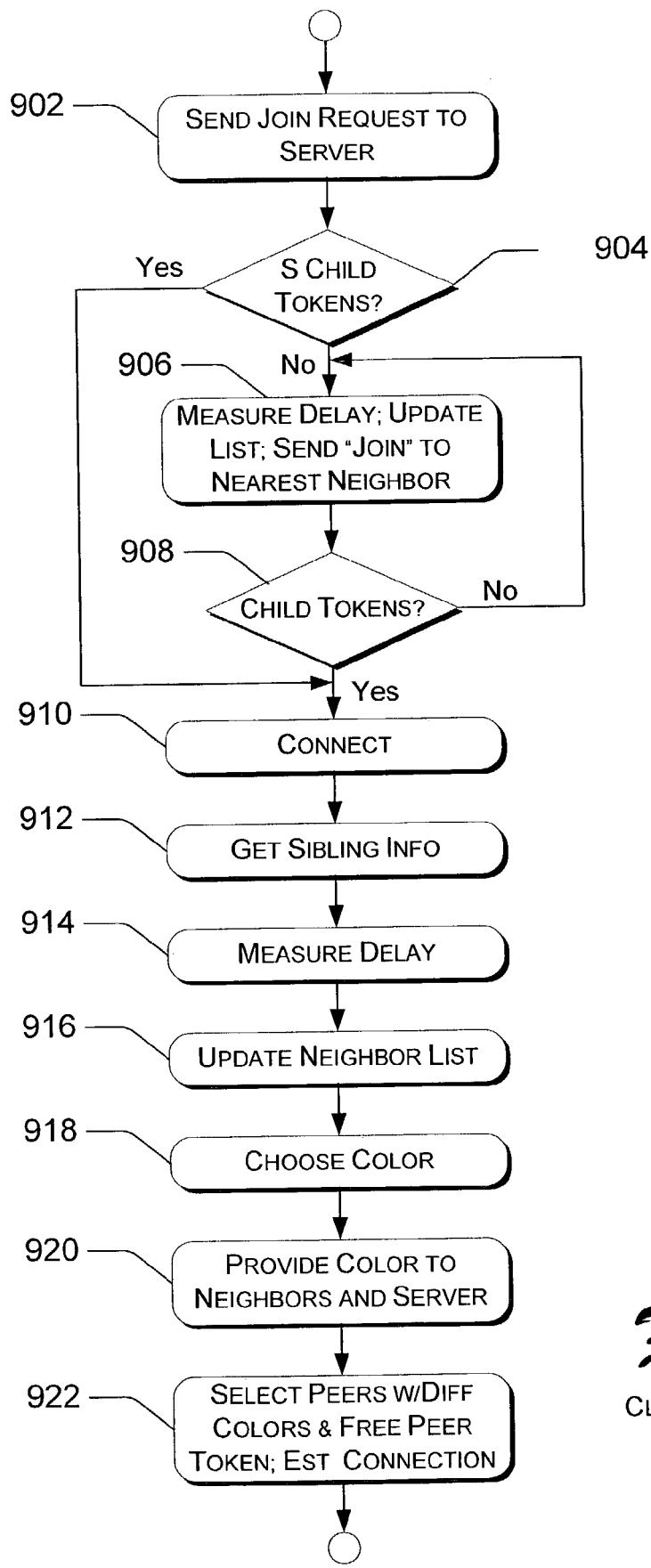
FIG. 9 is a flow diagram depicting a client-side methodological implementation of techniques described herein.

FIG. 9 is a flow diagram 900 that depicts a methodological implementation of a join policy from the point of view of a client. The client methodological implementation corresponds with the server methodological implementation described in relation to FIG. 8.

At block 902, the client submits a join request to the server. If the server has at least one child-token available ("Yes" branch, block 904), then the client connects to the server at block 910. If the server does not have a child-token available ("No" branch, block 904), then the client is redirected to a set of child nodes. The client measures delay (RTT) between itself and those child nodes, updates its neighbor list and send the join request to the nearest neighbor (block 906).

At block 908, the client again determines if the node receiving the join request has at least one child-token available. If not ("No" branch, block 908), then the process repeats blocks 906 and 908 until a node with at least one child-token is found. When a node is found that has an available child-token ("Yes" branch, block 908), then the client connects to that node at block 910 and that node decreases its child-token count by one.

At block 912, the client collects information about its siblings from the server. The client then measures delay (RTT) between itself and each of its siblings (block 914) and updates its neighbor list with the information at block 916.

The client chooses a color that is the fewest among the nodes in its neighbor list (block 918) and provides—at least—that information to its neighbors at block 920). At block 922, the client selects peers with different colors that have at least one free peer-token and establishes data connections with those peers.

Overlay Maintenance: Each member keeps local information that is a collection of information about its grandparent, parent, children, peers and neighbor list. A member periodically sends a heartbeat message to its parent and children. A member is considered dead if no heartbeat message was received during a specified time-out period. A member also periodically measures the delay between itself and its neighbors. The member updates its neighbor list while assuring the limited entries by replacing the farthest or dead nodes with nearer-than-existing neighbor(s).

Leave/Failure Policy: When a member leaves a group, its parent and upstream peers retrieve a child-token or peer-token, whichever is appropriate to their relationships with the departing member. All children of the departing member attempt to connect to their grandparent (i.e. the parent of the departing member). During the recovery process, child nodes and downstream peers of the departing member gradually update their local information and data connections.

The recovery from failure is similar, once a member is detected to be dead.

Overlay Improvement: The overlay may be improved by moving good nodes that have larger capacity of child-tokens and peer-tokens upward and bad nodes downward. Nodes may also be transferred to a better parent to help optimize the overlay.

Overlay Properties

A colored overlay has the following properties: (1) the overlay may help break through bottlenecks and enlarge the capacity of the system; (2) the overlay may improve reliability against node failures; and (3) the overlay is resilient to network dynamics such as packet loss, bandwidth fluctuation and delay jitter.

Figure 10B:
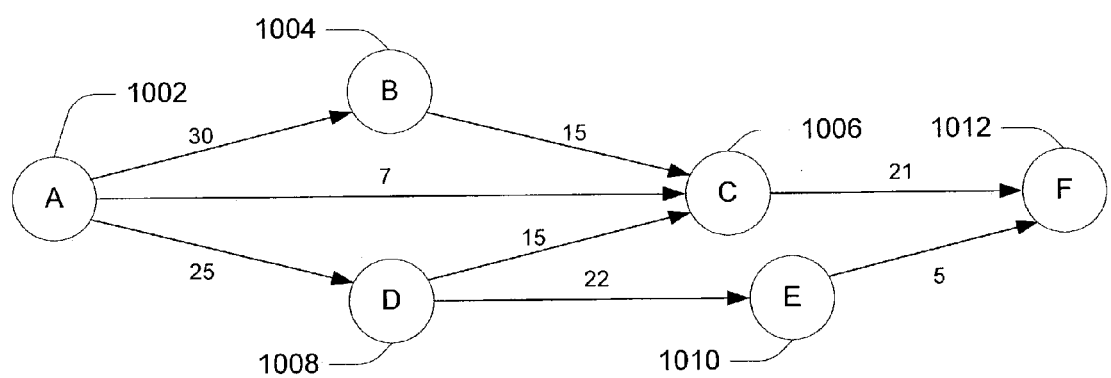

FIG. 10b is an example of a colored overlay 1000 that can help explain the properties mentioned above. The colored overlay 1000 includes nodes A 1002, B 1004, C 1006, D 1008, E 1010 and F 1012. The edges between each pair of nodes is associated with a number that reflects a required bit rate between the pair of nodes it connects.

The first property listed above (i.e. that a colored overlay may break through bottlenecks and enlarge the capacity of the system) can be seen in FIG. 10b. If the required bit rate is twenty (20) units (or 2 Mbps), node C 1006 and node F 1012 can never achieve the desired bit rate by using any other ALM technique while they can by using the colored overlay. Furthermore, the aggregated bandwidth for both node C 1006 and node F 1012 are greater than the required bit rate. Therefore, they can achieve a "streaming-while-downloading" effect (assuming they have a large buffer). In other words, the redundant bandwidth speeds up clients' download. Further, it alleviates the impact of node failures, e.g. only node E 1010 is affected when node D 1008 fails.

Suppose a member is receiving data from M senders. The available bandwidth of each path is $r_1, r_2 \ldots r_M$, respectively, each with delay $d_1, d_2 \ldots d_M$. Assume the size of the data block is B. Thus, the time a block successfully receives after the previous one is:

$$x = \frac{B + \sum_{i=1}^{M} r_i \cdot d_i}{\sum_{i=1}^{M} r_i}$$

To study how the network dynamics may impact the overall streaming jitter, a partial derivative of x with regard to $d_i$ is taken if there is a fluctuation of delay along the $i^{th}$ link, or with regard to $r_i$ if there is a fluctuation of the available bandwidth along the $i^{th}$ link:

$$\frac{\partial x}{\partial d_1} = \frac{r_i}{\sum_{k=1}^{M} r_k}$$

-continued $$\frac{\partial x}{\partial r_1} = \frac{\left(\sum_{k=1}^{M} r_k \cdot d_i - \sum_{k=1}^{M} r_k \cdot d_k - B\right)}{\left(\sum_{k=1}^{M} r_k\right)^2}$$

Clearly, both the absolute values of $(\partial x/\partial d_i)$ and $(\partial x/\partial r_i)$ are far smaller than one. As a result, the influence of network dynamics is attenuated, thanks to the multi-path delivery. In practical applications, the network metrics along all the links may fluctuate simultaneously. Their effects will counteract in a statistical sense.

Examplary Computer Environment

Figure 11:
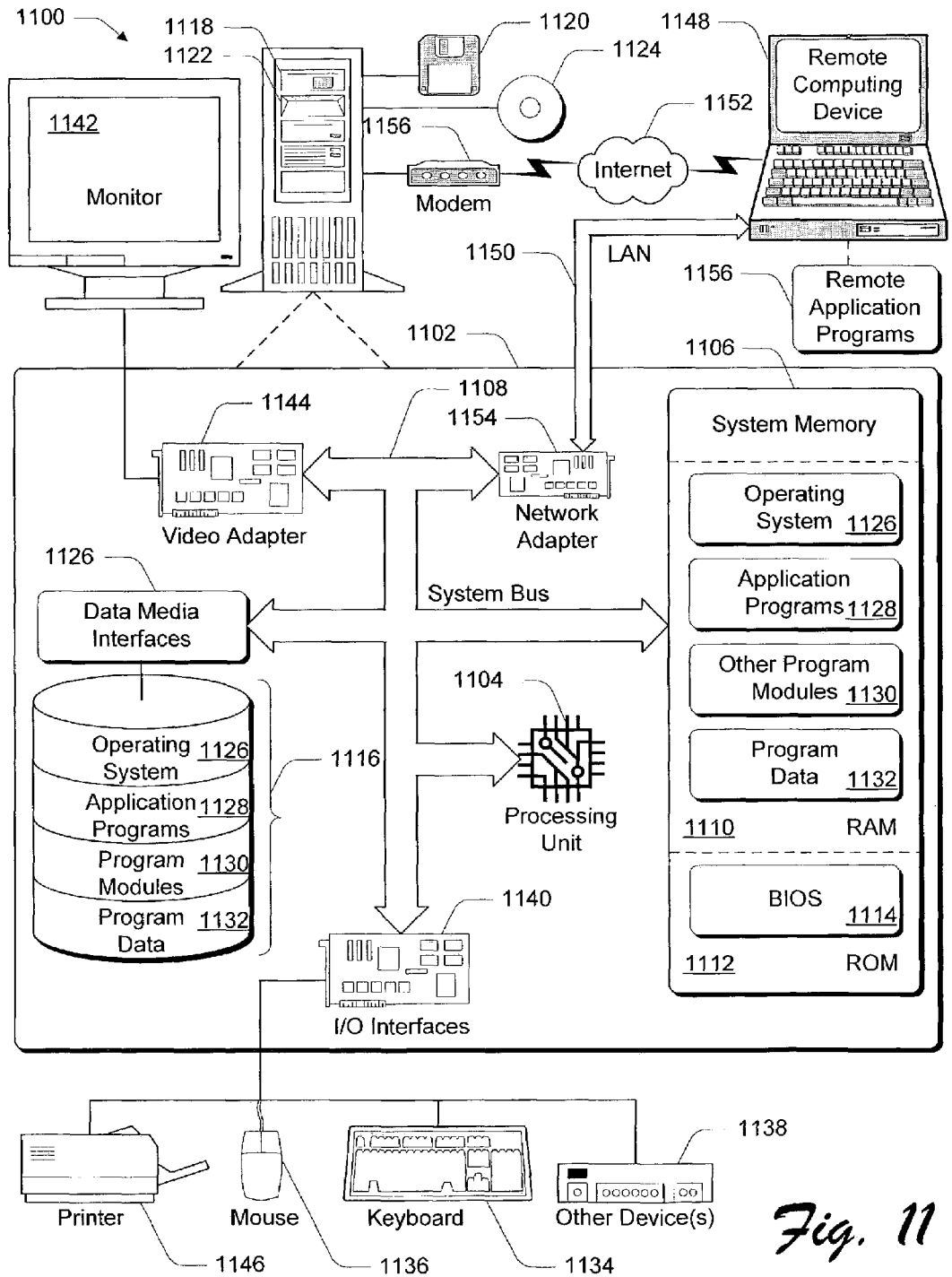
FIG. 11 is an exemplary computing environment.

The various components and functionality described herein are implemented with a computing system. FIG. 11 shows components of typical example of such a computing system, i.e. a computer, referred by to reference numeral 1100. The components shown in FIG. 11 are only examples, and are not intended to suggest any limitation as to the scope of the functionality of the invention; the invention is not necessarily dependent on the features shown in FIG. 11.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 11, the components of computer 1100 may include, but are not limited to, a processing unit 1102, a system memory 1104, and a system bus 1106 that couples various system components including the system memory to the processing unit 1102. The system bus 1106 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 1100 typically includes a variety of computer-readable media. Computer-readable media can be any available media that can be accessed by computer 1100 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1100. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1104 includes computer storage media in the form of volatile and/or nonvolatile memory such as read only memory (ROM) 1108 and random access memory (RAM) 1110. A basic input/output system 1112 (BIOS), containing the basic routines that help to transfer information between elements within computer 1100, such as during start-up, is typically stored in ROM 1108. RAM 1110 typically contains data and/or program modules that are immediately accessible to and/or presently being operated on by processing unit 1102. By way of example, and not limitation, FIG. 11 illustrates operating system 1114, application programs 1116, other program modules 1118, and program data 1120.

The computer 1100 may also include other removable/non-removable, volatile/nonvolatile computer storage media. By way of example only, FIG. 11 illustrates a hard disk drive 1122 that reads from or writes to non-removable, nonvolatile magnetic media, a magnetic disk drive 1124 that reads from or writes to a removable, nonvolatile magnetic disk 1126, and an optical disk drive 1128 that reads from or writes to a removable, nonvolatile optical disk 1130 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1122 is typically connected to the system bus 1106 through a non-removable memory interface such as data media interface 1132, and magnetic disk drive 1124 and optical disk drive 1128 are typically connected to the system bus 1106 by a removable memory interface such as interface 1134.

The drives and their associated computer storage media discussed above and illustrated in FIG. 11 provide storage of computer-readable instructions, data structures, program modules, and other data for computer 1100. In FIG. 11, for example, hard disk drive 1122 is illustrated as storing operating system 1115, application programs 1117, other program modules 1119, and program data 1121. Note that these components can either be the same as or different from operating system 1114, application programs 1116, other program modules 1118, and program data 1120. Operating system 1115, application programs 1117, other program modules 1119, and program data 1121 are given different numbers here to illustrate that, at a minimum, they are different copies. A user may enter commands and information into the computer 1100 through input devices such as a keyboard 1136 and pointing device 1138, commonly referred to as a mouse, trackball, or touch pad. Other input devices (not shown) may include a microphone, joystick, game pad, satellite dish, scanner, or the like. These and other input devices are often connected to the processing unit 1102 through an input/output (I/O) interface 1140 that is coupled to the system bus, but may be connected by other interface and bus structures, such as a parallel port, game port, or a universal serial bus (USB). A monitor 1142 or other type of display device is also connected to the system bus 1106 via an interface, such as a video adapter 1144. In addition to the monitor 1142, computers may also include other peripheral output devices 1146 (e.g., speakers) and one or more printers 1148, which may be connected through the I/O interface 1140.

The computer may operate in a networked environment using logical connections to one or more remote computers, such as a remote computing device 1150. The remote computing device 1150 may be a personal computer, a server, a router, a network PC, a peer device or other common network node, and typically includes many or all of the elements described above relative to computer 1100. The logical connections depicted in FIG. 11 include a local area network (LAN) 1152 and a wide area network (WAN) 1154. Although the WAN 1154 shown in FIG. 11 is the Internet, the WAN 1154 may also include other networks. Such networking environments are commonplace in offices, enterprise-wide computer networks, intranets, and the like.

When used in a LAN networking environment, the computer 1100 is connected to the LAN 1152 through a network interface or adapter 1156. When used in a WAN networking environment, the computer 1100 typically includes a modem 1158 or other means for establishing communications over the Internet 1154. The modem 1158, which may be internal or external, may be connected to the system bus 1106 via the I/O interface 1140, or other appropriate mechanism. In a networked environment, program modules depicted relative to the computer 1100, or portions thereof, may be stored in the remote computing device 1150. By way of example, and not limitation, FIG. 11 illustrates remote application programs 1160 as residing on remote computing device 1150. It will be appreciated that the network connections shown are exemplary and other means of establishing a communications link between the computers may be used.

CONCLUSION

The systems and methods as described thus provide a way to enhance multimedia streaming, improve error correction, and improve streaming/downloading speed by utilizing data connections between peer-pairs in a peer-paired pyramid streaming ($P^3S$) structure.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A computer implemented method having instructions executable by a processor for receiving streaming data, comprising:
   receiving a source data stream from a source computer;
   receiving one or more peer data streams from one or more peer computers, wherein the one or more peer computers are assigned a color by using a colored overlay, wherein a peer computer produces and sends packets of a peer data stream in the color corresponding to the peer computer;
   forming a cooperative peer to peer relationship among the peer computers to receive a data stream, wherein the peer computers schedule a departure instance of sending the data stream, wherein the cooperative peer to peer relationship is a peer-paired pyramid streaming architecture comprising the peer computers coupled at a same level as one or more peer pairs;
   combining at least a portion of the one or more peer data stream with at least a portion of the source data stream to derive a complete data stream;
   detecting a packet loss and recovering a lost packet, wherein a first peer computer affected by the loss requests a duplicate packet of the packet loss from a second peer computer before issuing a retransmission request to the source computer, wherein if the lost packet is not recovered after exchanging a request to the second peer computer, a receiver issues the retransmission request to the source computer;
   using a controlled delay between two sessions to the first peer computer and to the second peer computer to handle a burst loss, wherein the two sessions comprise a same content, which are destined for different peer computers, wherein the controlled delay is adjusted based on a current network status; and
   receiving different portions of the data stream, wherein the peer computers exchange streaming data with another peer computer to form the complete data stream, provided the receiver received an incomplete data stream;
   wherein the different portions of the data stream is not larger than the portion of the source data stream for aggregated bandwidth efficiency.

2. The computer implement method as recited in claim 1, wherein the source computer is a parent computer in a hierarchical computer system, and the peer computer is a sibling computer in the hierarchical computer system.

3. The computer implemented method as recited in claim 1, wherein complete data stream further comprises a bandwidth equal to a source bandwidth provided by the source computer.

4. The computer implemented method as recited in claim 1, wherein:
   the source data stream further comprises a first bandwidth;
   the peer data stream further comprises a second bandwidth;
   the first bandwidth is greater than the second bandwidth.

5. The computer implemented method as recited in claim 1, further comprising providing a client data stream to the peer computer, wherein the client data stream is a subset of the source data stream.

6. The computer implemented method as recited in claim 5, wherein the client data stream does not contain streaming data that is included in the peer data stream.

7. The computer implemented method as recited in claim 5, wherein the peer data stream includes packet data that was originally included in the source data stream but an error prevented the packet data from being received or rendered.

8. The computer implemented method as recited in claim 7, wherein the packet data is received in the peer data stream in response to a request for said packet data.

9. The computer implemented method as recited in claim 1, farther comprising selecting the peer computer from a plurality of system computers by using the colored overlay to determine the most appropriate system computer to utilize as a peer computer.

10. A computer implemented method having instructions executable by a processor for receiving peer to pyramid streaming of data, comprising:
    receiving a first streaming data having a first bandwidth from a server;
    receiving a second streaming data having a second bandwidth from a peer computer, wherein the peer computer schedules a departure instance of sending the second streaming data, wherein the peer computer is assigned a color by using a colored overlay, wherein the peer computer produces and sends packets of a data stream in the color corresponding to the peer computer;
    merging the first and the second streaming data to play the streaming data at a final bandwidth that is greater than the first bandwidth and the second bandwidth;
    transmitting at least a portion of the first streaming data to the peer computer;
    wherein the first streaming data and the second streaming data do not contain common data and a size of the first streaming data is larger than a size of the second streaming data;
    detecting a packet loss and recovering a lost packet, wherein the peer computer requests a duplicate packet of the packet loss from a second peer computer before issuing a retransmission request to the source computer, wherein if the lost packet is not recovered after exchanging a request to the second peer computer, a receiver issues the retransmission request to the source computer; and
    increasing a streaming speed by each node receiving data from one or more upstream nodes and by receiving mutually parity packets from each sender;
    wherein the different portions of the data stream is not larger than the portion of the source data stream for aggregated bandwidth efficiency.

11. The computer implemented method as recited in claim 10, wherein the first bandwidth is greater than the second bandwidth.

12. The computer implemented method as recited in claim 10, wherein the second streaming data farther comprises one or more data packets that are duplicates of lost data packets provided in the first streaming data but rendered unplayable by a streaming error.

13. The computer implemented method as recited in claim 10, farther comprising requesting a retransmission of the lost data packets from the server in the event that the lost data packets cannot be successfully recovered from the peer computer.

14. The computer implemented method as recited in claim 10, further comprising:

identifying a request from the peer computer to transmit a certain portion of the first streaming data to the peer computer; and transmitting the requested portion of the first streaming data to the peer computer.

* * * * *